US012610073B2

(12) United States Patent　　　(10) Patent No.: US 12,610,073 B2
Lundberg et al.　　　　　　　　　(45) Date of Patent: Apr. 21, 2026

(54) TRANSCODABLE SIGNED VIDEO DATA

(71) Applicant: Axis AB, Lund (SE)

(72) Inventors: Stefan Lundberg, Lund (SE); Björn Völcker, Lund (SE)

(73) Assignee: Axis AB, Lund (SE)

( * ) Notice: Subject to any disclaimer, the term of this patent is extended or adjusted under 35 U.S.C. 154(b) by 71 days.

(21) Appl. No.: 18/490,269

(22) Filed: Oct. 19, 2023

(65) Prior Publication Data

US 2024/0155146 A1　　May 9, 2024

(30) Foreign Application Priority Data

Nov. 9, 2022　(EP) .................................... 22206298

(51) Int. Cl.
H04N 19/46 (2014.01)
H04N 19/136 (2014.01)
H04N 19/184 (2014.01)
H04N 19/40 (2014.01)

(52) U.S. Cl.
CPC ........... H04N 19/46 (2014.11); H04N 19/136 (2014.11); H04N 19/184 (2014.11); H04N 19/40 (2014.11)

(58) Field of Classification Search
None
See application file for complete search history.

(56) References Cited

U.S. PATENT DOCUMENTS

| | | | |
|---|---|---|---|
| 7,581,094 B1 | 8/2009 | Apostolopoulos et al. | |
| 9,959,586 B1 | 5/2018 | Yu et al. | |
| 2004/0028281 A1* | 2/2004 | Cheng | G11B 20/00173 |
| | | | 382/248 |
| 2017/0078681 A1* | 3/2017 | Coward | H04N 19/40 |
| 2022/0086450 A1 | 3/2022 | Hultqvist et al. | |
| 2023/0112135 A1 | 4/2023 | Völcker et al. | |
| 2023/0116909 A1 | 4/2023 | Völcker et al. | |
| 2023/0246834 A1* | 8/2023 | Xu | H04N 21/4405 |
| | | | 713/171 |
| 2023/0269386 A1* | 8/2023 | Ilangovan | H04N 19/12 |
| | | | 375/240.12 |

OTHER PUBLICATIONS

Sun, Q., "A Secure and Robust Authentication Scheme for Video Transcoding," Paper, in IEEE Transactions on Circuits and Systems for Video Technology, vol. 16, No. 10, pp. 1232-1244, (2006).

(Continued)

*Primary Examiner* — Samuel D Fereja
(74) *Attorney, Agent, or Firm* — Volpe Koenig

(57) ABSTRACT

A method for providing a signed video bitstream suitable for transcoding from a first video format into a second video format, the method comprising: obtaining first video data in a lossy first video format; reconstructing a video sequence from the first video data; encoding the reconstructed video sequence as second video data in a second video format; computing first fingerprints of the first video data and second fingerprints of the second video data; deriving a first bitstring from the first fingerprints and a second bitstring from the second fingerprints; and providing a signed video bitstream, which includes the first video data and signature units, each signature unit including a first digital signature of the derived first bitstring and second digital signature of the derived second bitstring.

16 Claims, 7 Drawing Sheets

(56) References Cited

OTHER PUBLICATIONS

Sun, Q., "A secure and robust approach to scalable video authentication," 2003 International Conference on Multimedia and Expo. ICME '03. Proceedings (Cat. No.03TH8698), Baltimore, MD, USA, pp. II-209, (2003).

Uppdragshuset Novelty Search performed on Aug. 19, 2022 for "Signing Video for Transcoding".

Extended European Search Report issued Feb. 23, 2023 on for European Patent Application No. 22206298.6.

* cited by examiner

*200*

Obtain video
data in 1$^{st}$ format
— 210

Reconstruct
video sequence
— 212

Encode video
sequence in 2$^{nd}$ format
— 214

Encode video
sequence in ≥3$^{rd}$ format
— 214.1

Compute 1$^{st}$ and
2$^{nd}$ fingerprints
— 216

Compute ≥3$^{rd}$
fingerprints
— 216.1

Derive 1$^{st}$ and
2$^{nd}$ bitstrings
— 218

Derive ≥3$^{rd}$ bitstring
— 218.1

Provide signed
video bitstream
— 220

TRANSCODABLE SIGNED VIDEO DATA

FIELD OF INVENTION

The present disclosure relates to the field of security arrangements for protecting video data against unauthorized activity, especially in connection with storage and transmission of data. It proposes methods and devices for providing a signed video bitstream suitable for transcoding from a first video format into a second video format. It further proposes methods and devices for transcoding and validating a signed video bitstream.

TECHNICAL BACKGROUND

Digital signatures provide a layer of validation and security to digital messages that are transmitted through a non-secure channel. By means of the digital signature, the authenticity or integrity of a message can be validated, and non-repudiation can be ensured. With regard to video coding particularly, there exist safe and highly efficient methods for digitally signing a prediction-coded video sequence, which have been described in the prior art. See for example the earlier patent applications EP21201360.1 and EP21201362.7 by the present inventors. It is common practice to provide a signature not on the basis of the original video sequence but on the basis of video data that represents it in encoded form (or possibly, on the basis of data that has been derived from the video data by some pre-agreed rule) and add the signature to the video bitstream. As such, the video bitstream after signing may consist of the video data, the signature and any metadata. The video bitstream is validated by performing a pre-agreed operation on the video data to confirm that it matches the signature.

Because of the significant diversity among playback devices on the market, notably in today's video streaming applications, it occurs rather frequently that an end user finds himself unable to play a received video bitstream for lack of a decoder that supports the format of the video file. Requiring all playback devices to support all video formats would solve the compatibility issue, but it is not an economically viable solution in view of the rather high cost pressure on consumer electronics. Instead, compatibility can be restored by transcoding the video bitstream from its original format into a video format that suits the end user's playback device. The transcoding can be performed by the playback device itself, or by a different device, such as a host computer at the service of a group of end users. In one example, the video bitstream may be transcoded from an ITU-T H.265 format into an ITU-T H.264 format. In another example, the video bitstream may be transcoded from the ITU-T H.265 format configured with a first set of parameters into the ITU-T H.265 format configured with a different, second set of parameters. Generally speaking, the transcoding may include using a new encoder where one or more building blocks making up a video coding format have been replaced, such as the choice of frequency-domain transform to be applied to the pixel data or the coding method. Further, the transcoding may include using a new encoder where the value of a parameter that is defined to be variable in a given video coding format has been modified, such as target bitrate, quantization step, scaling factor, group-of-picture (GOP) structure, number of reference frames, or search range for motion estimation.

From the transcoded video data, the video sequence can be reconstructed without much visible defects, that is, the end user will hardly notice whether the played-back video sequence has been reconstructed from the received video bitstream or the transcoded version. If however the video bitstream contains a signature that has been provided on the basis of the video data, then clearly the transcoding operation will change the underlying video data so radically that it no longer matches the signature. In fact, the user-initiated legitimate transcoding operation may cause the validation to fail in a manner indistinguishable from unauthorized tampering. The user may then have to accept to use the transcoded video bitstream without being certain about its authenticity.

It is noted that the applicant's earlier application EP3968636A1 discloses a way of signing a video bitstream designed to be prunable, i.e., a video bitstream that allows the removal of one or more video frames. Here, because a structured hierarchical coding approach is followed, the effects of a pruning action will be fully predictable. It is therefore possible, without additional effort, to sign the video such that the user can validate the authenticity of every permutation of video data that remains after pruning. The term transcoding, as used in the present disclosure, does not extend to pure pruning.

Similarly, the U.S. Pat. No. 7,581,094B1 discloses a method for ensuring integrity of secure, scalably streamable media data. According to the method, an amount of media data is separated into segments comprising a plurality of truncatable units, and a cryptographic checksum for each segment is computed. Here, a truncatable unit is a portion of a packet payload that can be truncated from the packet payload without detrimental effect on the remainder of the packet. The segmented media data is claimed to be fit for bandwidth reduction allegedly by "transcoding". In the terminology of U.S. Pat. No. 7,581,094B1, "transcoding" can be truncation of portions of a packet payload, or it can refer to deletion of entire packets. It is noted once more that the term transcoding in the context of the present disclosure does not cover such truncation and packet deletion.

The problem of providing a signed video bitstream suitable for transcoding between two video formats has not been satisfactorily solved in the prior art.

SUMMARY

One objective of the present disclosure is to make available a method of providing a signed video bitstream suitable for transcoding from a first video format into a second video format. It is a particular objective to preserve the recipient's ability to validate the video bitstream even after the recipient has transcoded the video bitstream into a different video format. In the interest of maintaining the total bitrate in bounds, a further objective is to make available a method that supports lossy video formats, for which reconstruction may be imperfect. Similarly, the transcoding ability should be accomplished at the price of no more than a moderate total bitrate increase and/or without the need to introduce significant new procedures at the recipient side. A still further objective is to provide a method of validating a signed video bitstream that has undergone transcoding, particularly when the transcoding is performed by a transcoding entity that is not positively trusted. It is a still further objective to provide devices and computer programs for these purposes.

At least some of these objectives are achieved by the disclosure as defined in the independent claims. The dependent claims relate to advantageous embodiments.

In a first aspect of the present disclosure, a method of providing a signed video bitstream suitable for transcoding from a first video format into a second video format is proposed. The method comprises: obtaining first video data in a lossy first video format; reconstructing a video sequence from the first video data; encoding the reconstructed video sequence as second video data in a second video format; computing one or more first fingerprints of the first video data and one or more second fingerprints of the second video data; deriving at least one first bitstring from the first fingerprints and at least one second bitstring from the second fingerprints; and providing a signed video bitstream, which includes the first video data and one or more signature units, each signature unit including a first digital signature of the derived first bitstring and a second digital signature of the derived second bitstring. The signature unit may optionally include the derived first bitstring and second bitstring ('document approach').

From the preceding section of the present disclosure, it is recalled that the term "transcoding" is used in a sense that does not include bandwidth-reduction or bitrate-reduction operations for which the video bitstream has been prepared in advance, be it by truncation of truncatable units, discarding of non-essential data packets, pruning of dedicated video frame or any similar technique. Accordingly, the method of the first aspect does not presuppose neither that the second video data is a subset of the first video data, nor that the first and second video data have a considerable overlap. In the context of the method of the first aspect, the first and second video data, both of which relate to the same video sequence, preferably have substantially zero overlap.

In the context of the present disclosure, the first and second "video formats" may be different video coding formats, such as ITU-T H.264, ITU-T H.265 or AV1. Two video coding formats may differ with regard to one or more of their building blocks, e.g., by different choices of frequency-domain transform (e.g., DCT, DST, DFT, wavelet transform) or coding method (e.g., entropy, Huffman, Lempel-Ziv, run-length, binary or non-binary arithmetic coding, such as context-adaptive variable-length coding, CAVLC, context-adaptive binary arithmetic coding, CABAC). Alternatively, the first and second video formats may be different instantiations of a common video coding format, wherein different parameter assignments have been used for the two instantiations. For example, the instantiations may differ with regard to the value of a parameter that is defined or is variable in the common video coding format, such as target bitrate, quantization step, scaling factor, group-of-picture (GOP) structure, number of references frames, or search range for motion estimation.

The inventors have devised the method according to the first aspect such that the reconstruction of the video sequence and its encoding in the second video format are equivalent to the operations taking place when a recipient of the video bitstream transcodes it into the second video format. As a consequence, the recipient will be able to use the second digital signature in the signature unit for validating video data in the second format that results from the transcoding. This ability is ensured merely by extending the signature unit with the second digital signature (and optionally the second bitstring), which in practice represents a very limited bitrate increase.

In some embodiments, the first digital signature is independent of the second digital signature. This enables a recipient to validate the second video data without having access to the second bitstring from the sender, namely, by deriving the second bitstring based on transcoded video data and verifying the derived bitstring using the second digital signature. In other embodiments ('document approach'), the signature unit contains the first and second bitstrings and one digital signature that is common to both; in other words, the "first digital signature" and "second digital signature" refer to the same digital signature. (It is recalled that each of the bitstrings is a combination of the respective fingerprints or a fingerprint of said combination of the respective fingerprints.) Using a single digital signature limits the number of calls to an (external) cryptographic entity that provides the digital signatures. In still other embodiments, the signature unit contains the first and second bitstrings and one digital signature of each. If the signature unit includes two digital signatures, the processing of one of these may in some circumstances become redundant, e.g. if the recipient is going to use the signed video bitstream without transcoding. In fact, the possible combining of the digital fingerprints of the first video data and the second video data are combined into a common fingerprint could in some implementations render recipient-side validation more cumbersome, with a need to transcode the signed video bitstream into the second video format even in cases where the video sequence is going to be consumed in the first video format.

In some embodiments, the first bitstring is linked to the second bitstring or the second bitstring is linked to the first bitstring. In other words, the first bitstring shall have a dependence on the second bitstring, or vice versa. It is recalled that the first (second) bitstring is derived from one or more first fingerprints of the first (second) video data. Here, a fingerprint can be a hash—or salted hash—of a video frame or of a macroblock in a video frame. In embodiments where the first and second bitstrings are linked, the recipient will be able to detect whether the video bitstream has undergone unauthorized editing and/or whether one of the bitstrings has been replaced. In a particular scenario where the signature unit includes a first bitstring, a first digital signature of the first bitstring, a second bitstring and a second digital signature of the second bitstring, the linking could allow the recipient to discover an attack where an unauthorized third party has replaced the first video data and the first bitstring contemporaneously.

In some embodiments, the first video data includes a sequence of video data units, and the first fingerprints are computed for one video data unit each and are linked sequentially. It is appreciated that the video data units may be sequential with respect to time or space. The video data units may for example be macroblocks or video frames. In these embodiments, alternatively or additionally, the second video data include a sequence of video data units, and the second fingerprints are computed for one video data unit each and are linked sequentially. Optionally, both the first and the second fingerprints are so linked.

In some embodiments, the first video data is necessary for reconstructing the video sequence from the signed video bitstream. For example, the signed video bitstream might not contain, apart from the first video data, any data from which the video sequence can be reconstructed completely. Especially, the second video data may be absent from the signed video bitstream; the second video data is used for computing the second fingerprints while the method of the first aspect is executed and may then be discarded. In another example, the signed video bitstream consists of the first video data, the one or more signature units and optional metadata.

In some embodiments, the signed video bitstream further includes metadata which identifies the second video format. The second video format can be identified in terms of the video coding format (e.g., a standardized format, such as ITU-T H.264) and/or in terms of a value assignment to one or more configurable parameters of this video coding format. Although versatile decoders are sometimes available for some video coding formats, the knowledge of these parameter values may be necessary for correct encoding. A benefit of including the metadata which identifies the second video format—and any supported further video formats—is that a recipient becomes aware of the scope of applicability of transcoding, i.e., the recipient is informed about the video format(s) into which the signed video bitstream can be transcoded while still allowing its authenticity to be validated. It is understood that the first video format is known to the recipient or can be identified on the basis of the first video data on its own, e.g., by inspecting a file identifier, header structure or other characteristic information that has been joined to the video data by embedding, encapsulation or the like. This way, a (unique) standard-compliant decoder can be used to reconstruct the video sequence so that the second video data generated in the next step will be consistent with the signature units. In embodiments where the signed video bitstream lacks information that identifies the second video format, the identity of the second video format may be known to the recipient.

In some embodiments, each signature unit relates to a segment of the signed video bitstream comprising at least one group of pictures (GOP). Preferably, the segment coincides with one GOP or a number of full GOPs. In the context of predictive video coding and as also used in this disclosure, a GOP is a subsequence of video frames that do not refer to any video frame outside the subsequence; it can be decoded without reference to any other video frames. These embodiments tend to reduce the number of digital signatures to be processed at the recipient's end, and thus the number of calls to a cryptographic entity with this capability. If instead one GOP was allowed to be split between two signature units (i.e., to be associated with both of these), the decoding of a particular video frame could in some cases require processing the second signature unit too, in order to decode such further video frames to which the particular video frame refers directly or indirectly. Further, these embodiments could contribute to a less granular validation process, in the sense that the effects of a failed validation are contained in a limited number of video frames. In specific ones of these embodiments, the spacing of two consecutive signature units may be at least 1 minute of playback time, preferably at least 5 minutes of playback time, and more preferably at least 10 minutes of playback time.

In some embodiments, the signed video bitstream is transcodable into not only the second video format but also into a third, fourth etc. video format. This is achieved by encoding the video sequence reconstructed from the first video data in the third video format, computing third fingerprints from the third video data, deriving a third bitstring $H_3$ from the third fingerprints, and providing a third digital signature thereof. The third digital signature is included in the signature unit for thereby securing the third bitstring $H_3$, optionally together with the third bitstring $H_3$ itself. As noted, the digital signature of the third bitstring $H_3$ may be common to multiple bitstrings (e.g., $s([H_1, H_2, H_3])$) or it may be an independent digital signature $s(H_3)$. A recipient in possession of this signed video bitstream is free to perform transcoding from the first into the third video format. Alternatively, the method includes encoding the video sequence reconstructed from the second video data in the third video format, computing alternative fingerprints from the third video data, deriving an alternative third bitstring $H'_3$ from the third fingerprints, and including a digital signature of the alternative third bitstring $H'_3$ in the signature unit as described. Optionally, the alternative third bitstring $H'_3$ is included too. A recipient in possession of this alternative signed video bitstream is free to perform transcoding from the second into the third video format (which may in practice require a preceding transcoding of the first video data into the second video format). Further alternatively, at very little added overhead, the signed video bitstream may include a digital signature of the third bitstring $H_3$ as well as the alternative third bitstring $H'_3$ (and optionally these bitstrings as well), so that the recipient is free to select either one of the transcoding paths leading up to the third video format $(1 \rightarrow 3$ or $1 \rightarrow 2 \rightarrow 3)$.

In a second aspect of the present disclosure, there is provided a method of transcoding and validating a signed video bitstream, wherein the signed bitstream includes first video data in a lossy first video format and one or more signature units, each signature unit including a first digital signature relating to video data in the first video format and a second digital signature relating to video data obtainable by transcoding into a second video format, and optionally a first bitstring and a second bitstring. The method comprises: reconstructing a video sequence from the first video data; encoding the reconstructed video sequence as second video data in the second video format; computing one or more fingerprints of the second video data; deriving a bitstring from the computed fingerprints; and validating the second video data using the second digital signature. The final validation step may either include verifying the derived bitstring using the second digital signature. Alternatively ('document approach'), the validation step includes verifying a second bitstring in said one or more signature units using the digital signature, and comparing the derived bitstring and the verified second bitstring.

A recipient of the signed video bitstream has the option of consuming the first video data in the first video format, e.g., to playback the video sequence using a decoder for the first video format. The recipient has the further option of executing the method according to the second aspect, which will enable the recipient to consume the second video data in the second video format, e.g., for playback using a decoder adapted for the second video format. Whichever option the recipient chooses, he or she is able to validate the video bitstream (i.e., verify the authenticity of the video bitstream) using the content of the signature units therein. This flexibility is achieved at the price of just a minimal added overhead, which increases the total bitrate of the signed video bitstream negligibly in most use cases. Nor does the flexibility render necessary any specialized or nonstandard operations at the recipient's end, which could otherwise block or slow down the uptake of the proposed methods in consumer devices. In general terms, the method according to the second aspect shares many of the advantages associated with the first aspect and it can be implemented with an equal degree of technical variation.

The method of transcoding and validating a signed video bitstream can be performed jointly or cooperatively, that is, by work sharing among different entities or by a single entity though at different times. In this sense, the method can be regarded as two sub-methods. The first sub-method, primarily representing the transcoding aspect, includes: reconstructing a video sequence from the first video data; and encoding the reconstructed video sequence as second video data in a second video format. The second sub-method, primarily directed at validating the transcoded video data and optionally consuming (e.g., playing) it in case of a positive validation outcome, includes: computing one or more fingerprints of the second video data; deriving a bitstring from the computed fingerprints; and validating the second video data using the second digital signature (e.g., utilizing the second digital signature to perform an operation for ascertaining whether the derived bitstring is authentic). Optionally, the first sub-method includes forming a new signed bitstream including the second video data and the one or more signature units from the original bitstream but not including the first video data. This new signed bitstream is the input to the second sub-method.

In a third aspect of the present disclosure, there is provided a signed video bitstream, which includes: first video data in a lossy first video format and one or more signature units. Each signature unit includes at least a first and a second digital signature. The first digital signature is a signature of at least one first bitstring derived from first fingerprints computed from the first video data, and the second digital signature is a signature of at least one second bitstring derived from second fingerprints, which have been computed from second video data obtained by encoding, in a second video format, a video sequence reconstructed from the first video data. The signature unit may optionally include the first and second bitstrings. The signed video bitstream may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

The signed video bitstream according to the third aspect is specifically adapted for the intended technical use on the recipient side, i.e., for direct consumption in the first video format or transcoding into the second video format, each time with an ability to verify its authenticity. Generally speaking, the signed video bitstream shares many of the advantages associated with the first and second aspects of this disclosure, and it can be implemented with an equal degree of technical variation.

In a fourth aspect of the present disclosure, there is provided a device comprising processing circuitry arranged to perform the method of the first or the second aspect.

The device according the fourth aspect shares many of the advantages associated with the first and second aspects of this disclosure, and it can be implemented with an equal degree of technical variation.

The present disclosure further relates to a computer program containing instructions for causing a computer, or the above-described device in particular, to carry out the above method. The computer program may be stored or distributed on a data carrier in the sense already defined.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Technical Framework

In the terminology of the present disclosure, a "video bitstream" includes any substantially linear data structure, which may be similar to a sequence of bit values. A video bitstream can be stored or transmitted on a data carrier; see examples above. The video bitstream represents a video sequence, which may be understood to be a sequence of video frames to be played back sequentially with nominal time intervals. Each video frame may be partitioned into macroblocks, such as a transform block or a prediction block, or a block with both of these uses. The usage of "frame" and "macroblock" herein is intended to be consistent with an H.26x video coding standard or similar specifications.

Figure 1A:
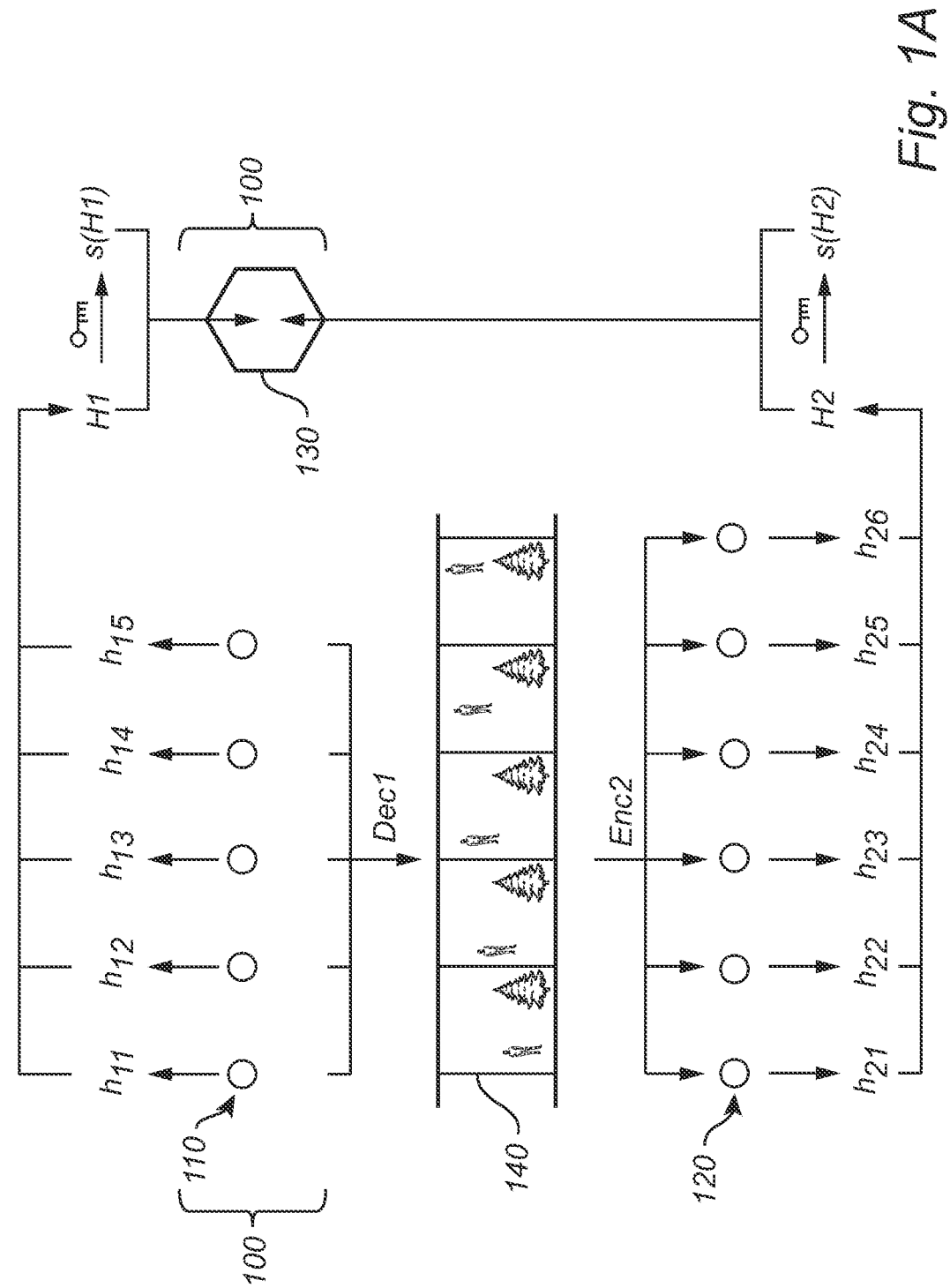
FIG. 1A illustrates the provisioning of a signed video stream allowing transcoding at least from a first video format into a second video format, in accordance with embodiments herein ('document approach')

FIG. 1A depicts a section of a signed video bitstream 100, which includes first data units 110 in a first video format and signature units 130 associated with the first data units 110. The video bitstream 100 represents an original video sequence (not shown) including five consecutive video frames. The video frames have been encoded as the first data units 110 using predictive or non-predictive coding. Predictive coding may be carried out with respect to entire frames or with respect to one macroblock position (e.g., upper left, upper right, lower left, lower right, if a 2×2 partition into macroblocks is used). There may be a one-to-one correspondence between first data units 110 and video frames, as illustrated. Alternatively, each video frame is encoded as $M \geq 1$ first data units 110, where M may be fixed or variable across video frames. Further alternatively, each of the first data units 110 represents $N \geq 1$ video frames, where N may be fixed or variable. In still further variations, each data unit 110 may be allowed to represent any number of frames in the original video sequence, and each video frame may be encoded by any number of data units 110. For the purposes of the present disclosure, a data unit (including the first data units 110 and second data units 120 illustrated in FIG. 1A) may have any suitable format and structure. No assumption is being made other than that the data unit can be separated (or extracted) from the video bitstream, e.g. to allow the data unit to be processed, without any need to decode that data unit or any surrounding data units. The first data units 110 may be in accordance with a proprietary or standardized video coding format, such as ITU-T H.264, H.265 or AV1.

The signed video bitstream 100 may include further types of units in addition to the first data units 110 and associated signature units 130 shown in the upper part of FIG. 1A. For example, the bitstream 100 may include, without departing from the scope of the present disclosure, dedicated metadata units. The signature units 130 are separable from the signed video bitstream 100 in a same or similar manner as the first data units 110 are. Each of the signature units 130 can be associated with a plurality of first data units 110. In FIG. 1A, it is understood that the first data units 110 between two consecutive signature units 130 are associated with the later signature unit 130. This rule for associating the first data units 110 and the signature units 130 is not an essential feature of the disclosure, and other rules are possible without departing from the scope of this disclosure. For example, a signature unit 130 could be associated with a set of first data units 110 that correspond to one group of pictures (GOP), such as a GOP immediately preceding the signature unit 130. In the ITU-T H.264 and H.265 formats, the signature unit 130 may be included as a Supplemental Enhancement Information (SEI) message in the video bitstream 100. In the AV1 standard, the signature may be included in a Metadata Open Bitstream Unit (OBU).

Each of the signature units 130 includes a digital signature $s(H_1)$ of a first bitstring $H_1$ derived from fingerprints $h_{11}$, $h_{12}$, $h_{13}$, . . . of those first data units 110 that are associated with the signature unit 130. Optionally, the signature unit 130 includes the first bitstring $H_1$ as well. According to embodiments to be described below, the signature units 130 may further include a digital signature $s(H_2)$ of a second bitstring $H_2$ derived from fingerprints $h_{21}$, $h_{22}$, $h_{23}$, . . . of associated second data units 120 representing the same original video sequence though in a second video format. Similarly, the signature unit 130 may optionally include the second bitstring $H_2$ as well. In the case where a signature unit 130 includes multiple bitstrings, the signature unit 130 may have one digital signature for all of these bitstrings (e.g., of a concatenation of these bitstrings), or multiple digital signatures for single bitstrings each, or multiple digital signatures for subgroups of bitstrings each.

Each one of the fingerprints $h_{11}$, $h_{12}$, $h_{13}$, . . . may be a hash or a salted hash of a first data unit 110. The fingerprints and first data units 110 may be in a one-to-one relationship or a one-to-many relationship. The hashes may be generated by a hash function (or one-way function) h, which is a cryptographic function that provides a safety level considered adequate in view of the sensitivity of the video data to be signed and/or in view of the value that would be at stake if the video data was manipulated by an unauthorized party. Three examples are SHA-256, SHA3-512 and RSA-1024. The hash function shall be predefined (e.g., it shall be reproducible) so that the fingerprints can be regenerated when the recipient is going to verify the fingerprints. A salted hash may be a hash of a combination of the data unit (or a portion of the data unit) and a cryptographic salt; the presence of the salt may stop an unauthorized party who has access to multiple hashes from guessing what hash function is being used. Potentially useful cryptographic salts include a value of an active internal counter, a random number, and a time and place of signing.

Each of the fingerprints $h_{11}$, $h_{12}$, . . . can be computed from the first data unit 110 directly, e.g., from transform coefficients or other video data therein. The fingerprint may be computed from the entire data unit or from a subset thereof that has been extracted according to a pre-agreed rule. The fingerprint may be written $h_{11}=h(X_{110.1})$ or $h_{11}=h([X_{110.1}, \sigma])$ or $h_{11}=h(X_{110.1}, \sigma)$, where $X_{110.1}$ denotes data from a first one of the first data units 110 and a is the cryptographic salt. Under the third option, the hash function h has a parametric dependence on the second argument, to which the salt $\sigma$ has been assigned. In the present disclosure, the square-brackets notation [·] refers to a generic data combination operation, which may include concatenating the data linearly (juxtaposition) or in various staggered arrangements. The combination operation may further include an arithmetic operation on the data, such as bitwise OR, XOR, multiplication, division or a modulo operation. Alternatively, the fingerprint $h_{11}$ is computed from a reconstructed macroblock or frame obtained by decoding the data unit 110: $h_{11}=h(Y_{110.1})$ or $h_{11}=h([Y_{110.1}, \sigma])$ or $h_{11}=h(Y_{110.1}, \sigma)$ where $Y_{110.1}$ represents pixel values or other plaintext data reconstructed from the first one of the first data units 110 and $\sigma$ is the cryptographic salt.

Optionally, to discover unauthorized removal or insertion of data units, the fingerprints can be linked together sequentially. This is to say, each fingerprint has a dependence on the next or previous fingerprint, e.g., the input to the hash includes the hash of the next or previous fingerprint. The linking can for example be realized as follows: $h_{11}=h(X_{110.1})$, $h_{12}=h([h_{11}, X_{110.2}])$, $h_{13}=h([h_{12}, X_{110.3}])$ etc., where $X_{110.2}$, $X_{110.3}$ denote data from a second and third one of the first data units 110. Another way of linking the fingerprints is: $h_{11}=h(X_{110.1})$, $h_{12}=h([X_{110.1}, X_{110.2}])$, $h_{13}=h([X_{110.2}, X_{110.3}])$ etc.

A bitstring $H_1$ in the signature unit 130 may be a combination of fingerprints $h_{11}$, $h_{12}$, $h_{13}$, . . . of the associated first data units 110:

$$H_1=[h_{11},h_{12},h_{13}, . . . ],$$

or it may be a fingerprint of said combination of fingerprints of the associated first data units 110:

$$H_1=h([h_{11},h_{12},h_{13}, . . . ]).$$

Under the second option, the bitstring $H_1$ may be generated using the same hash function as the hash function used to generate the fingerprints $h_{11}$, $h_{12}$, $h_{13}$, . . . of the associated first data units 110; alternatively, two different hash functions are used. As the square-bracket notation suggests, the combination of the fingerprints (or 'document') may be a list or other concatenation of string representations of the fingerprints.

Figure 2:
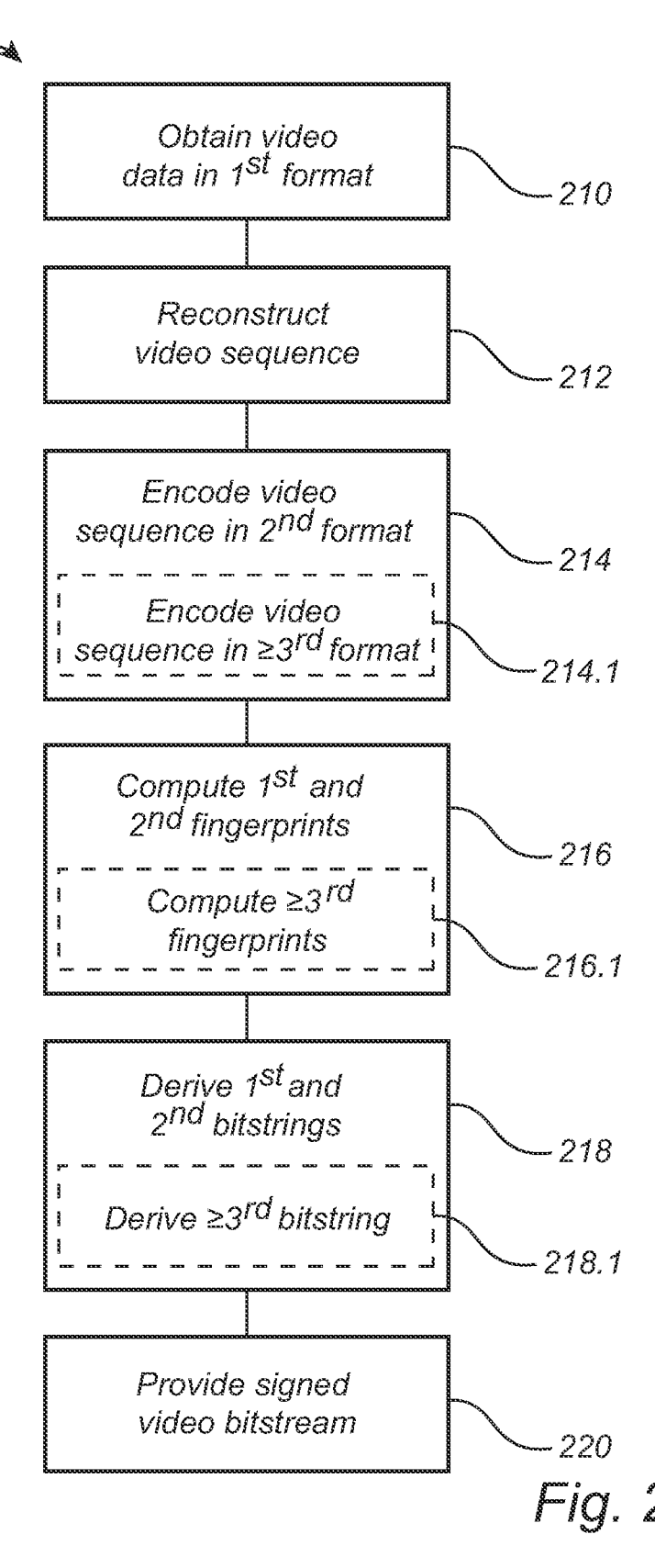
FIG. 2 is a flowchart of a method of providing a signed video bitstream suitable for transcoding from a first video format into a second video format, in accordance with embodiments herein.

Still with reference to the signature units 130, a cryptographic element with a pre-stored private key may be utilized to generate the digital signature $s(H_1)$ of the bitstring $H_1$ therein. The recipient of the signed video bitstream may be supposed to hold a public key belonging to the same key pair; see element 401 in FIGS. 4A and 4B. The public key enables the recipient to verify the authenticity of data associated with the digital signature $s(H_1)$ produced by the sender's cryptographic element but not to generate new signatures. The public key could also be included as metadata in the signed video bitstream, in which case there is no compelling need to store the public key at the recipient side.
Method of Providing a Signed Video Sequence With reference to FIG. 2, there will now be described a method 200 of providing a signed video bitstream 100 suitable for transcoding from a first video format into a second video format. If the original video sequence is acquired using a recording device, the method 200 may be performed in the recording device or in a different device that is associated with the recording device or connected to the recording device over a safe communication channel. The signing becomes relevant notably when the video bitstream is to be transferred over an unreliable communication channel or stored in an unreliable external memory.

Figure 5:
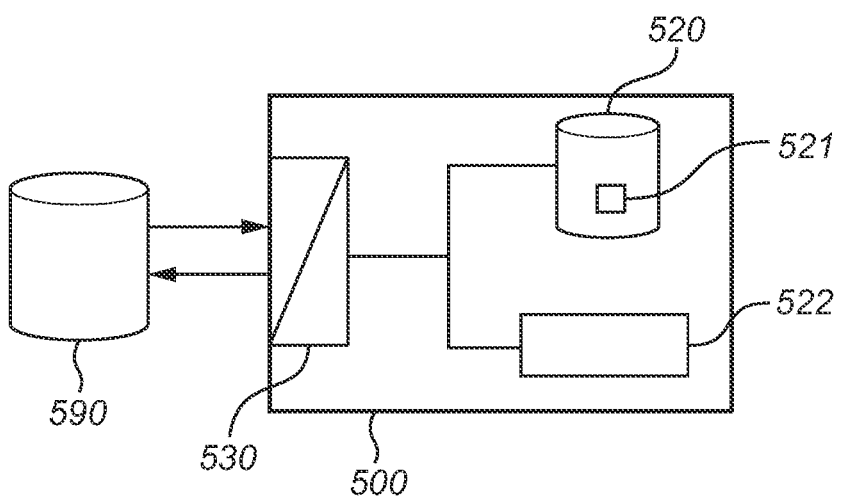
FIG. 5 shows a device suitable for performing the methods illustrated in FIGS. 2 and 3.

The device performing the method 200 may be an application or system dedicated for a particular purpose, or it may be a generic data processing device with the basic functional structure shown in FIG. 5. As illustrated, the device 500 includes processing circuitry 510, memory 520 and an external interface 530. The memory 520 may be suitable for storing a computer program 521 with instructions implementing the method 200. The external interface 530 may be a communication interface allowing the device 500 to communicate with a compatible device (not shown) held by a recipient and/or a video content author (e.g., a recording device), or it may allow read and write operations in an external memory 590 suitable for storing video bitstreams.

Figure 6:
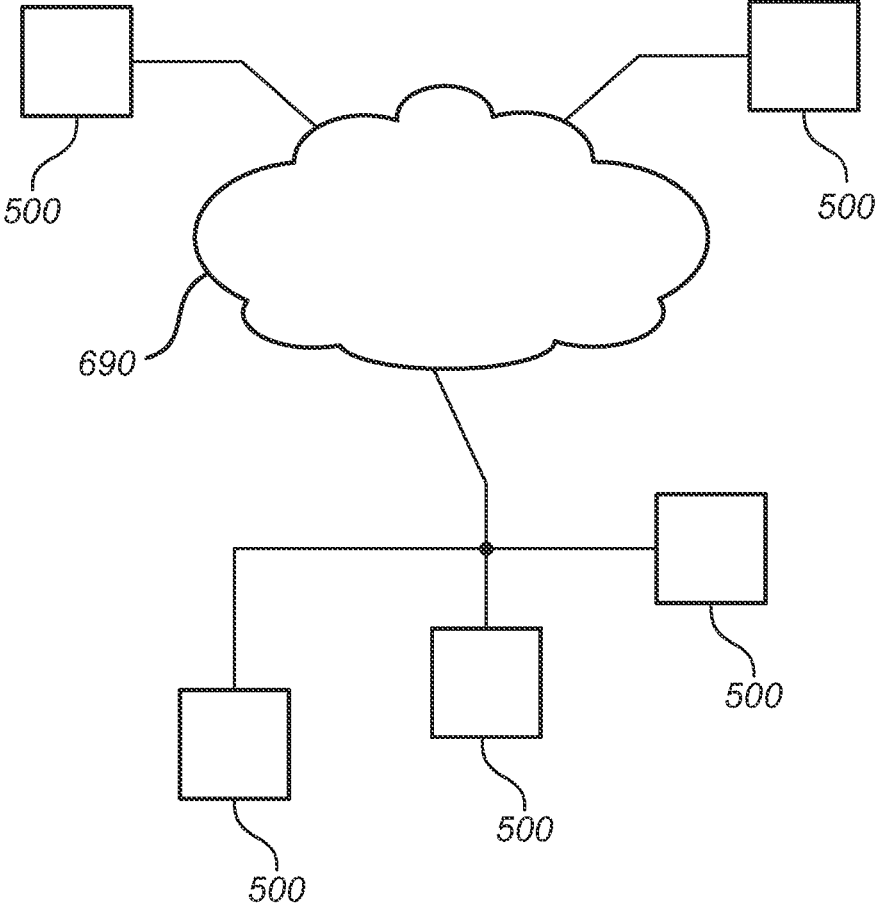
FIG. 6 shows a number of such devices, which are connected over a local-area or a wide-area network, or both.

FIG. 6 illustrates the case where a video bitstream is transferred among multiple devices. It is noted that the device 500 performing the editing method 200 may be connected to the recipient device 500 over a local-area network (connection lines in lower half of FIG. 6) or over a wide-area network 690. Attacks on the video bitstream 100 can occur on either type of network, which justifies the signing.

Returning to FIG. 2, one embodiment of the method 200 begins with a first step 210 in which first video data is obtained. The first video data, for example the first data units 110 seen in FIG. 1A, is preferably in a lossy first video format. The first video data may be obtained by encoding an original video sequence in the first video format using encoder software or encoder hardware provided for this purpose. Alternatively, the first video data is input data to the device or process that performs the method 200.

In a second step 212, a video sequence 140 is reconstructed from the first video data. The reconstruction may be performed using a decoder software or decoder hardware suitable for the first video format, denoted Dec1 in FIGS. 1A and 1B, and the output is pixel values or other plaintext data. It is noted that predictive encoder products inherently include a decoder part, because the prediction reference shall be the reconstructed video frame or macroblock (i.e., obtained by encoding followed by decoding) rather than the original video frame or macroblock. Because the first video format is preferably a lossy video format, the reconstructed video sequence 140 may differ slightly from the original video sequence. Several lossy video formats that achieve significant data compression at the price of just a limited visual degradation have been described in the prior art. Apart from the visual aspect, if the transcoded video data is to remain possible to validate on the recipient side, it is preferable for the second step 212 to use a decoder Dec1 that is compliant with a standard or with an equivalent pre-agreed specification. For example, if a proprietary decoder product is used that includes a post-processing step (e.g., post-filtering) in addition to the specified operations, this post-processing step is preferably deactivated in order to make the reconstructed video sequence 140 suitable as input to the next step 214; alternatively, the reconstructed video sequence 140 can be extracted as an intermediate variable from the nonstandard decoding process.

In a third step 214, the reconstructed video sequence 140 is encoded in a second video format, whereby second video data is obtained. The second video format may be a lossy video format too. In FIG. 1A, this is illustrated by applying encoder software or encoder hardware suitable for the second video format, denoted Enc2, to the reconstructed video sequence 140. The encoding process generates the second data units 120.

The first video format is different from the second video format. The two video formats may correspond to two different video coding formats (e.g., ITU-T H.264, ITU-T H.265 or AV1). A video coding format may be described or defined by specifying its building blocks, such as a frequency-domain transform (e.g., DCT, DST, DFT, wavelet transform) to be applied to the pixel data or a coding method (e.g., entropy, Huffman, Lempel-Ziv, run-length, binary or non-binary arithmetic coding), or the way these blocks exchange data among each other. Alternatively, if the video coding format includes at least one parameter defined to be variable, the first and second video formats may be two instantiations of the video coding format, wherein different parameter assignments have been used for the two instantiations. For example, the instantiations may differ with regard to the value of a parameter such as target bitrate, quantization step, scaling factor, group-of-picture (GOP) structure, number of reference frames, or search range for motion estimation. It is understood that an instantiation operation may include applying the parameter assignment to a template (model) of computer-executable code, such as an encoder or decoder process, wherein the template represents the video coding format. It may in some cases be possible to modify the parameters of an existing instantiation of an encoder or decoder.

It is understood that the first and second video formats are such that the first and second video data have substantially zero overlap. This is to say, even though the first and second video data are representations of a same video sequence, the first video data is substantially free from bit patterns that reappear in the second video data; to the extent bit patterns do reappear, these are fragments of a limited length, and the similarity is merely accidental. In particular, it is understood that the second video data cannot be obtained by pruning or truncating parts (e.g., dedicated prunable or truncatable parts) of the first video data. This means that a transcoding from the first to the second video format must normally include a decoding Dec1 of the first video data into an intermediary reconstructed video sequence, which is represented as pixel values or similar plain text data, and which is then fed to a second-format encoder Enc2.

In a fourth step 216, fingerprints of the first video data (first fingerprints $h_{11}$, $h_{12}$, $h_{13}$, $h_{14}$, $h_{15}$ in FIG. 1A) and fingerprints of the second video data (second fingerprints $h_{21}$, $h_{22}$, $h_{23}$, $h_{24}$, $h_{25}$) are computed. The computation may proceed in a per se known way, including the options reviewed in the preceding subsection of this disclosure, e.g., with or without sequential linking, with or without salt, and using any suitable hash function.

In a fifth step 218, a first bitstring $H_1$ is derived from the first fingerprints computed in the fourth step 216, and a second bitstring $H_2$ is derived from the second fingerprints. As described in the preceding subsection, each of the bitstrings $H_1$, $H_2$ may be derived by concatenating fingerprints. In one example, assuming one signature unit 130 is associated with $n_1$ first data units 110 and $n_2$ second data units 120 (in FIG. 1A, $n_1=n_2=5$), the first bitstring may be given by $H_1=[h_{11}, h_{12}, h_{13}, \ldots, h_{1,n_1}]$. It is optional to link the first bitstring to the second bitstring or vice versa. The linking may include introducing a dependence between the first bitstring and the second bitstring, by linking the second bitstring to the first bitstring:

$$\begin{cases} H_1 = [h_{11}, h_{12}, \ldots, h_{1,n_1}] \\ H_2 = [h_{21}, h_{22}, \ldots, h_{2,n_2}, h(H_1)] \end{cases}$$

or linking the first bitstring to the second bitstring:

$$\begin{cases} H_1 = [h_{11}, h_{12}, \ldots, h_{1,n_1}, h(H_2)] \\ H_2 = [h_{21}, h_{22}, \ldots, h_{2,n_2}] \end{cases}$$

where h is a hash function. Inserting $h(H_j)$ and $H_j$ achieve the same linking action, and thus the same level of data security, although the former option could save some computational effort in the evaluation of the hash function. If the bitstrings are defined to be fingerprints of the combination of fingerprints, then the linking may be ensured as follows:

$$\begin{cases} H_1 = h([h_{11}, h_{12}, \ldots, h_{1,n_1}]) \\ H_2 = h([h_{21}, h_{22}, \ldots, h_{2,n_2}, H_1]) \end{cases} \text{ or}$$

$$\begin{cases} H_1 = h([h_{11}, h_{12}, \ldots, h_{1,n_1}, H_2]) \\ H_2 = h([h_{21}, h_{22}, \ldots, h_{2,n_2}]) \end{cases}.$$

Such linking could enable a recipient of the signed video bitstream 100 to discover an attack where an unauthorized third party has contemporaneously replaced the first video data and the first bitstring.

In a sixth step 220, one or more signature units 130 are formed. To this end, a digital signature of the bitstrings $H_1$, $H_2$ is provided (e.g., $s([H_1, H_2])$, where s represents a signature function, or a digital signature of each of the bitstrings $H_1$, $H_2$ is provided (e.g., $s(H_1),s(H_2)$). The first digital signature $s(H_1)$ of the first bitstring $H_1$ may be independent of the second digital signature $s(H_2)$ of the second bitstring $H_2$, or vice versa. As mentioned, the digital signatures may be provided using a private key in a cryptographic element (not shown) located in the device that performs the present method 200; alternatively, the cryptographic element may be located in an external resource, from which said device requests the digital signature. The digital signature(s) may furthermore be provided by means of symmetric key cryptography.

Figure 1B:
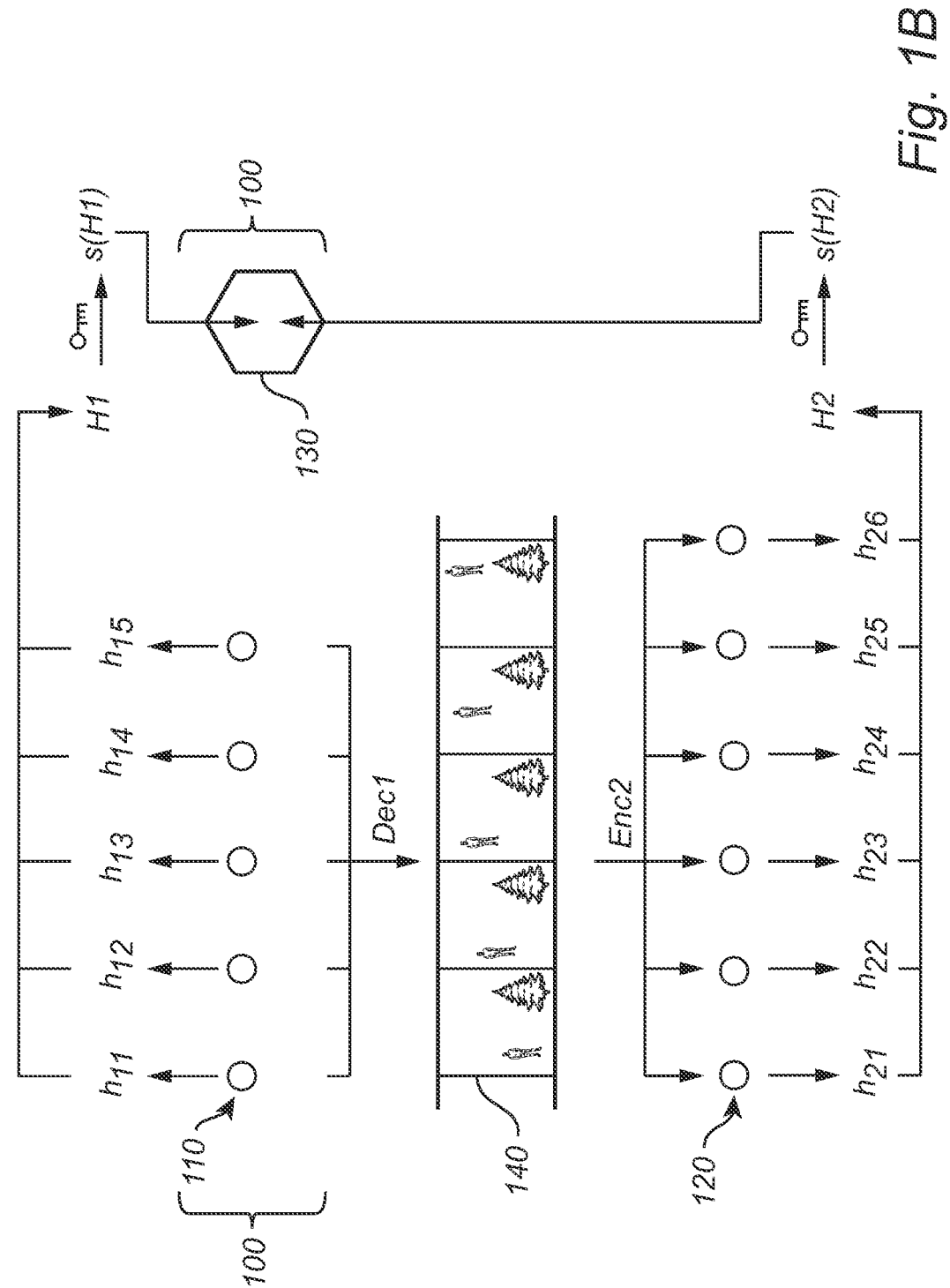
FIG. 1B describes an alternative to the approach in FIG. 1A, under which the signature unit has a different content.

Each signature unit 130 may include, as shown in FIG. 1B, the first and second digital signatures $s(H_1),s(H_2)$ of the bitstrings $H_1$, $H_2$ which have been derived from those portions of the first video data and second video data that are associated with the signature unit 130. One signature unit 130 is typically associated with an entire GOP or a number of entire GOPs. In some embodiments, the spacing of two consecutive signature units 130 may be at least 1 minute of playback time, preferably at least 5 minutes of playback time, and more preferably at least 10 minutes of playback time. In the ITU-T H.264 and H.265 formats, the signature unit 130 may be included as a Supplemental Enhancement Information (SEI) message, and in the AV1 standard, the signature may be included in a Metadata Open Bitstream Unit (OBU). As noted, the first and second digital signatures may be provided in the form of a single digital signature.

In some embodiments ('document approach'), as shown in FIG. 1A, the signature unit 130 further includes the first and second bitstrings $H_1$, $H_2$.

The signed video bitstream 100 provided by the method 200 includes the signature units 130, the associated first video data (first video data units 110) and optional additional types of units (e.g., dedicated metadata units). At least in some embodiments, the second video data does not form part of the signed video bitstream 100, but a recipient wanting to use the second video format has to provide the video data in the second video format by transcoding. It follows that, the first video data is necessary for reconstructing the video sequence from the signed video bitstream 100. If follows furthermore that the reconstructed video sequence 140 and the second video data (second video data units 120) can be discarded upon completion of the method 200, or even earlier, upon completion of the last steps where they are used, steps 214 and 216 respectively. The second video data may be discarded by being deleted from a memory, flushed from the memory, marked as free to be overwritten etc.

In some embodiments, the signed video bitstream 100 includes metadata which identifies the second video format. As described above, the second video format can be identified in terms of the video coding format (e.g., a standardized format, such as ITU-T H.264) and/or in terms of a value assignment to one or more configurable parameters of a video coding format to be used when instantiating the video coding format.

In a further development, the above-described method 200 is extended with additional steps allowing the resulting signed video bitstream 100 to be transcoded (while its authenticity remains verifiable) into a third video format and possibly further video formats. The additional steps include: encoding 214.1 the video sequence reconstructed from the first video data as third video data in a third video format; computing 216.1 one or more third fingerprints of the third video data; and deriving 218.1 least one third bitstring $H_3$ from the third fingerprints. Each signature unit 130 in the video bitstream 100 then comprises the first, second and third digital signatures and optionally the bitstrings $H_1$, $H_2$, $H_3$ as well. (The third video data is absent from the signed video bitstream 100.) A recipient of this signed video bitstream 100 is free to perform transcoding from the first video format into the third video format directly. Alternatively, to allow transcoding from the second video format into the third video format (and thus, from the first video format via the second video format to the third video format), step 214.1 shall instead include encoding a video sequence reconstructed from the second video data in the third video format.

Method of Transcodinq and Validating a Signed Video Sequence

Figure 3:
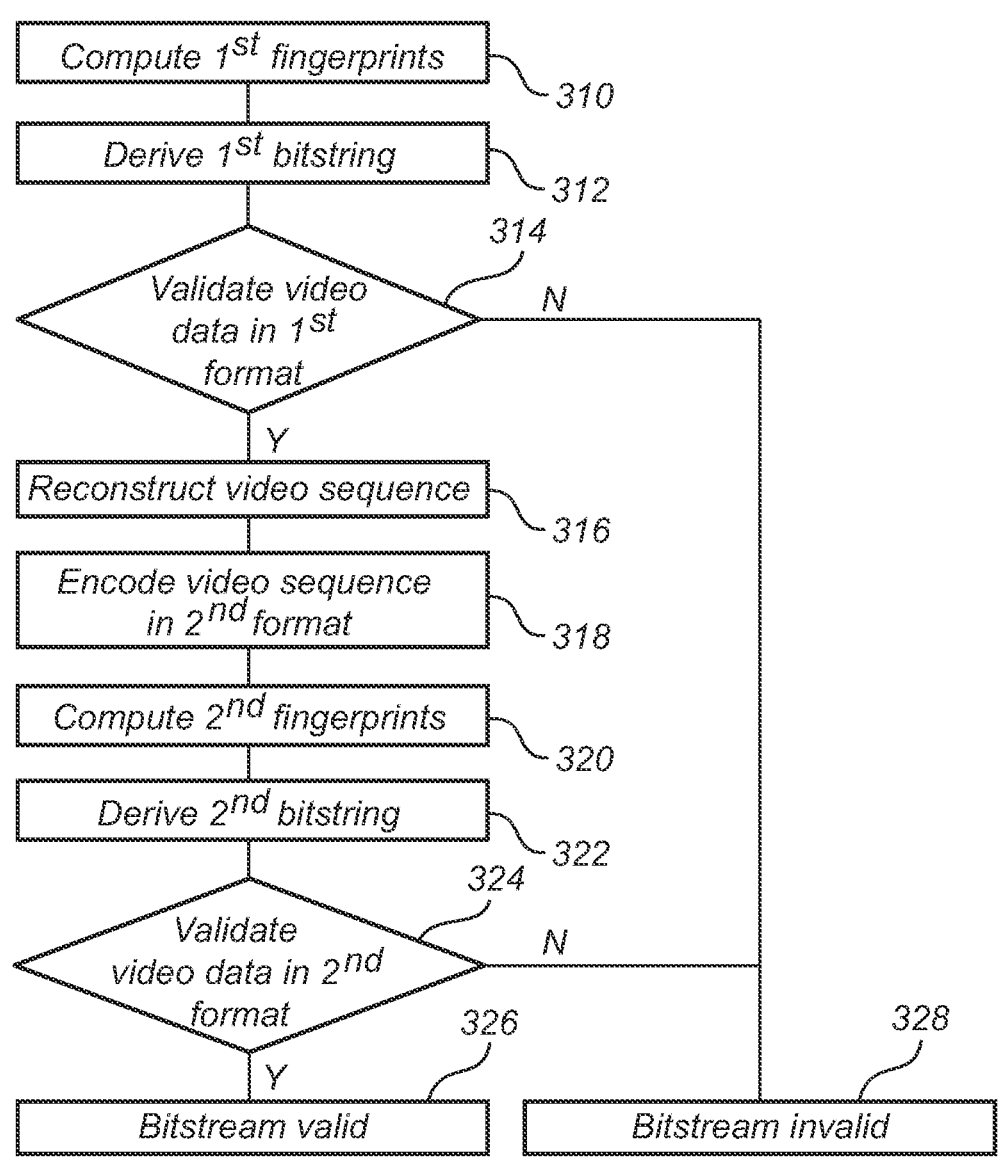
FIG. 3 is a flowchart of a method of transcoding and validating a signed video bitstream from a first video format into a second video format, in accordance with embodiments herein.
Figure 4A:
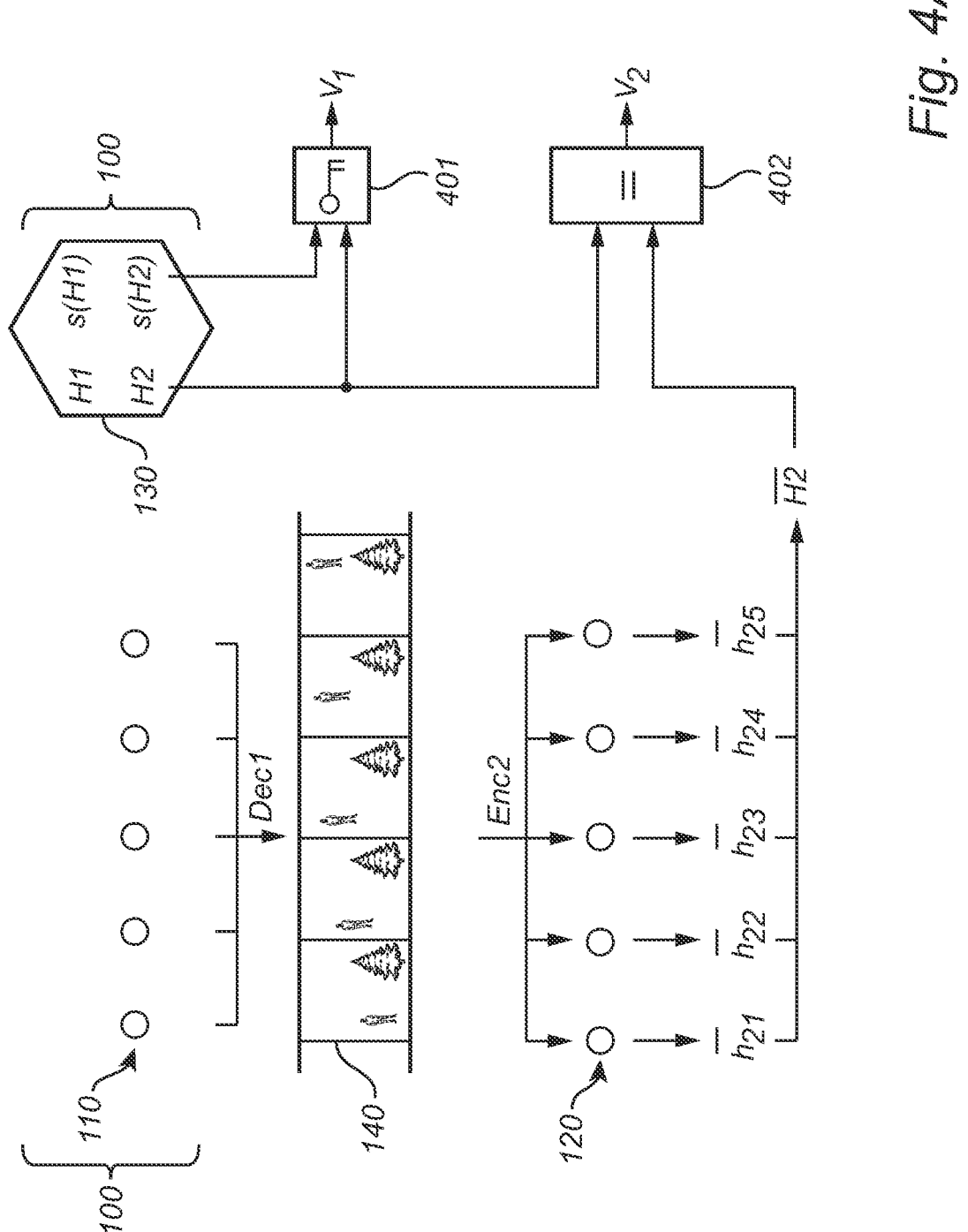
FIG. 4A illustrates the transcoding of a signed video stream from a first video format into a second format as well as operations for validating the video data provided by the transcoding, in accordance with embodiments herein ('document approach')
Figure 4B:
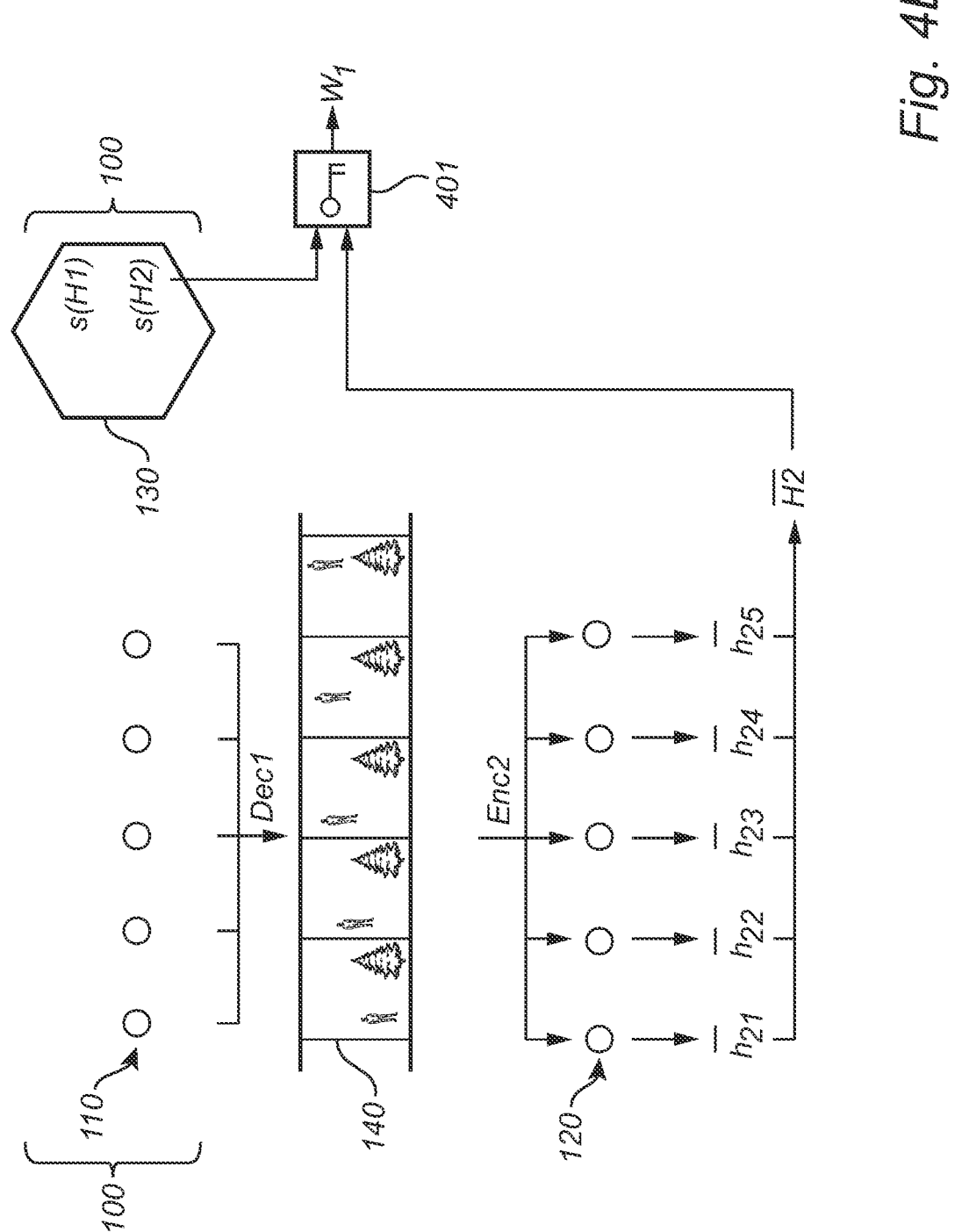
FIG. 4B describes an alternative to the approach seen in FIG. 4A, under which the signature unit has a different content.

FIG. 3 is a flowchart of a method 300 of transcoding and validating a signed video bitstream 100. The signed video bitstream 100 is assumed to include first video data 110 in a first video format and one or more signature units 130, wherein the first video format is preferably a lossy format. Further, each signature unit 130 includes a first digital signature $s(H_1)$ relating to video data in the first video format and a second digital signature $s(H_2)$ relating to video data obtainable by transcoding into a second video format; a video bitstream 100 where the signature unit 130 has this content is illustrated in FIG. 4B. Optionally, each signature unit 130 may further include a first bitstring $H_1$ and a second bitstring $H_2$ such that the first digital signature is a signature of the first bitstring and the second digital signature is a signature of the second bitstring; a video bitstream 100 where the signature unit 130 has this content is illustrated in FIG. 4A ('document approach'). A signed video bitstream 100 of any of these types can be obtained by executing the above-described method 200. The origin of the signed video bitstream 100, however, is irrelevant from the point of view of the present method 300, which can be applied to any signed video bitstream 100 with these characteristics, notably since the origin is usually not determinable at the recipient side anyhow.

The method 300 may for example be performed in a video management system (VMS) or a playback device. In one envisioned use case, a signed video bitstream 100 in a first video format is stored in memory 590, and it is then retrieved from the memory 590 at a later point in time and played back in a different, second video format. The device 500 illustrated in functional form in FIGS. 5 and 6 is suitable for executing the transcoding method 300. As mentioned initially, the method 300 may as well be performed jointly by two entities, such as by a VMS (steps 316 and 318) and a playback device (steps 320, 322 and 324), or analogously by a streaming host and a playback device. The transcoding entity (VMS, streaming host etc.) may transfer the video data 120 to the second entity (playback device or the like) in the form of new signed bitstream (e.g., a file or a transitory stream or torrent) with video data compliant with the second video format. Because the second entity that receives the new signed bitstream can autonomously verify the authenticity of the video data 120 in the second video using the signature units 130, the second entity need not be in a trust relationship with the transcoding entity. The one or more signature units 130 may be included in the new signed bitstream, or they may reach the second entity over a different communication path. For example, the new signed bitstream may include the one or more signature units 130 from the original bitstream (i.e., without necessarily processing these) and the second video data 120 obtained by transcoding. The first video data 110 need not be included in the new signed bitstream, but it can be discarded.

Steps 310, 312 and 314 form part of the method 300 only in some embodiments. Because these steps are optional, they are described separately below.

In a main embodiment, the execution of the method 300 begins with a step 316, where the video sequence 140 is reconstructed, e.g., by feeding the first video data to a decoder Dec1 configured for the first video format. As mentioned above, the decoder Dec1 is preferably compliant with a standard or with a specification that has been pre-agreed between sender and recipient, so that the present second step 312 is performed consistently with the second step 212 of the method 200 by which the signed video sequence 100 was provided.

The reconstructed video sequence 140 is then encoded, in a next step 318, in the second video format. This is illustrated in FIGS. 4A and 4B by the operation Enc2. The combination of the Dec1 and Enc2 operations may be described as transcoding from the first video format into the second video format.

Next, in a step 320, fingerprints $\bar{h}_{21}$, $\bar{h}_{22}$, $\bar{h}_{23}$, $\bar{h}_{24}$, $\bar{h}_{25}$ are computed using a hash function equivalent to the hash function h in use at the sender side. Because it may occur that the first and/or second video data processed at the recipient side is unauthentic, this description uses different notation for the fingerprints computed at the recipient side and the sender side: $\bar{h}_{21}$, $\bar{h}_{22}$, $\bar{h}_{23}$, $\bar{h}_{24}$, $\bar{h}_{25}$ and $h_{21}$, $h_{22}$, $h_{23}$, $h_{24}$, $h_{25}$, respectively.

In a further step 322 of the method 300, a bitstring $\bar{H}_2$ is derived from the computed fingerprints $\bar{h}_{21}$, $\bar{h}_{22}$, $\bar{h}_{23}$, $\bar{h}_{24}$, $\bar{h}_{25}$.

In some embodiments, where the second bitstring is linked to the first bitstring, e.g., as per $$\begin{cases} H_1 = [h_{11}, h_{12}, \ldots, h_{1,n_1}] \\ H_2 = [h_{21}, h_{22}, \ldots, h_{2,n_2}, h(H_1)] \end{cases}$$

among several other options, the fingerprints $h_{11}$, $h_{12}$, . . ., $h_{1,n_1}$ of the first video data constitute additional input to the present step 322. More precisely, the fingerprints of the first video data are computed and hashed into the quantity $h(H_1)$. This adds a further layer of data security.

In other embodiments, where instead the first bitstring is linked to the second bitstring and where the signature unit 130 includes the first bitstring $H_1$ (FIG. 4A), the recipient has the option of additionally verifying the first bitstring $H_1$ in the signature unit 130 and computing a first bitstring $\bar{H}_1$ from the first video data in the signed video bitstream 100. If the comparison of the verified first bitstring $H_1$ and computed first bitstring $\bar{H}_1$ returns a true outcome, some further attack scenarios can be ruled out. For example, in implementations where the execution of the method 300 is divided between a transcoding entity and a second entity (e.g., end user, playback device), the linking of the first bitstring to the second bitstring may be used to detect a scenario where the transcoding entity removes or adds video frames before an event in the video sequence to convey the false impression that the event occurred earlier or later. The setup becomes even more powerful if the fingerprints are timestamped, e.g., if they are provided as hashes salted with the recording time.

Using the derived bitstring $\bar{H}_2$, the second video data is then validated, in a final step 324, using the second digital signature $s(H_2)$. For the avoidance of doubt, it is noted that the validation of the second video data in step 324 is indirect, without any processing that acts on the second video data itself.

In embodiments where the signature units 130 do not contain the second bitstring $H_2$, step 324 is executed by verifying the derived bitstring $\bar{H}_2$ using the second digital signature $s(H_2)$. For example, the derived bitstring $\bar{H}_2$ can be verified using a public key belonging to the same key pair as the private key which was used to generate the second digital signature $s(H_2)$. In FIG. 4B, this is illustrated by feeding the derived bitstring $\bar{H}_2$ and second digital signature $s(H_2)$ to a cryptographic entity 401 where the public key is stored, which outputs a binary result W1 representing the outcome of the verification. The signed video bitstream 100 may be either consumed, in the case of a positive outcome, or it may be quarantined from any further use or processing.

Alternatively, in embodiments where the signature units 130 do contain the second bitstring $H_2$ ('document approach'), step 324 may include verifying a second bitstring $(H_2)$ from the signature 130 unit using the digital signature $s(H_2)$, and comparing the derived bitstring $\bar{H}_2$ and the verified second bitstring $H_2$. In the first substep, the second bitstring $H_2$ can be verified using a public key, as described above. In FIG. 4A, this is illustrated by feeding the second bitstring $H_2$ and second signature $s(H_2)$ to a cryptographic entity 401 where the public key is stored, which yields a binary result V1. If the result V1 is true-valued, the second bitstring $H_2$ is considered to be authentic, and the execution proceeds to the comparison of the derived bitstring $\overline{H}_2$ and the verified second bitstring $H_2$. In the opposite case, where the result V1 is false, it is not meaningful to perform the comparison; rather it may be concluded immediately that the signed video bitstream 100 is invalid (box 328). For this reason, it is advantageous to perform the verification of the second bitstring $H_2$ using the digital signature $s(H_2)$ early in the execution flow, such as before step 316, to avoid pointless processing effort. As to the substep of comparing of the derived bitstring $\overline{H}_2$ and the verified second bitstring $H_2$, the comparison may be a bitwise equality check, as suggested by the functional block 402 in FIG. 4A. If the result V2 is true, then it may be concluded that the signed video bitstream 100 is authentic as far as this signature unit 130 is concerned. Relevant ones of the above-described steps 316, 318, 320, 322 and 324 are repeated for any further signature units 130 in the signed video bitstream 100. If the outcome is positive for all signature units 130, the execution flow ends in box 326 (bitstream valid), otherwise in box 328 (bitstream invalid).

In a further development of the present method 300, step 316 is preceded by steps of computing 310 one or more first fingerprints $\overline{h}_{11}$, $\overline{h}_{12}$, $h_{13}$, . . . of the first video data;

deriving 312 a first bitstring $\overline{H}_1$ from the computed first fingerprints; and validating 314 the first video data 110 in the signed video bitstream 100 using the first digital signature $s(H_1)$.

Step 314 can include verifying the derived first bitstring $\overline{H}_1$ using the first digital signature $s(H_1)$, e.g., by feeding these inputs to a cryptographic entity 401 that stores a public key associated with the private key by which first digital signature $s(H_1)$ was generated at the sender side. Alternatively, step 314 may include, if the signature unit 130 includes a first bitstring $H_1$ relating to video data in the first video format, verifying the first bitstring $H_1$ using the first digital signature $s(H_1)$ and comparing the derived bitstring $\overline{H}_1$ and the verified first bitstring $H_1$. (It is noted that, if the signature unit 130 includes a first and second bitstring $H_1$, $H_2$ and a single digital signature of both bitstrings, e.g. $s([H_1, H_2])$, then this verification of the first bitstring $H_1$ will inherently be a verification of the second bitstring $H_2$ too. As such, the second bitstring $H_2$ need not be re-verified in [the alternative implementation of] step 324.)

If the first video data 110 is successfully validated, it is meaningful to execute step 316 onwards. In the case of a negative outcome of the validation of the first video data 110, however, the execution flow may proceed directly to a conclusion of invalidity (box 328), namely because invalid first video data cannot be transcoded into valid second video data. This optional sequence of preceding steps may be a shortcut to a negative conclusion of the method 300 as a whole and may thereby save the effort of transcoding in cases doomed to fail.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims. Further, the present disclosure may be readily generalized beyond video data, to include any types of data for which multiple coding formats exist, such as documents, databases, images, audio, immersive media and the like.

The invention claimed is:

1. A method for providing a signed video bitstream suitable for transcoding from a first video format into a second video format, the method comprising:

obtaining first video data in a lossy first video format;

reconstructing a video sequence from the first video data;

encoding the reconstructed video sequence as second video data in a second video format;

computing one or more first fingerprints of the first video data and one or more second fingerprints of the second video data;

deriving at least one first bitstring from the first fingerprints and at least one second bitstring from the second fingerprints; and providing a signed video bitstream stored or transmitted on a data carrier, which includes the first video data and one or more signature units, each signature unit including a first digital signature of the derived first bitstring and a second digital signature of the derived second bitstring, for thereby enabling a recipient of the signed video bitstream to validate the signed video bitstream after the signed video bitstream has been transcoded into the second video format, wherein each signature unit optionally includes the derived first bitstring and second bitstring.

2. The method of claim 1, wherein the first bitstring is linked to the second bitstring or the second bitstring is linked to the first bitstring.

3. The method of claim 1, wherein the first digital signature is independent of the second digital signature.

4. The method of claim 1, wherein:

the first and/or second video data includes a sequence of video data units; and the first and/or second fingerprints are computed for one video data unit each and are linked sequentially.

5. The method of claim 1, wherein the second video data is absent from the signed video bitstream.

6. The method of claim 1, wherein the first and second video formats are different video coding formats, or the first and second video formats are different instantiations, with different parameter assignments, of a common video coding format.

7. The method of claim 1, wherein the signed video bitstream further includes metadata identifying the second video format.

8. The method of claim 1, wherein the transcoding from the first video format into the second video format includes decoding of the first video data into an intermediary reconstructed video sequence that is fed into an encoder of the second format.

9. The method of claim 1, further comprising:

encoding the video sequence reconstructed from the first video data or a video sequence reconstructed from the second video data as third video data in a third video format;

computing one or more third fingerprints of the third video data; and deriving least one third bitstring from the third fingerprints.

10. The method of claim 1, wherein each of the bitstrings is a combination of the respective fingerprints or a fingerprint of said combination.

11. The method of claim 1, wherein at least one of the fingerprints is a hash or a salted hash of a video frame or of a macroblock in a video frame.

12. The method of claim 1, wherein the steps of the method are performed by a data processing device.

13. A method of transcoding and validating a signed video bitstream stored or transmitted on a data carrier, wherein the signed video bitstream includes first video data in a lossy first video format and one or more signature units, each signature unit including at least a first digital signature and a second digital signature for thereby enabling a recipient of the signed video bitstream to validate the signed video bitstream after the signed video bitstream has been transcoded into a second video format, wherein each signature unit optionally includes a first bitstring and a second bitstring, wherein:

the first digital signature is a signature of at least one first bitstring derived from first fingerprints computed from the first video data, and the second digital signature is a signature of at least one second bitstring derived from second fingerprints, which have been computed from second video data obtained by encoding, in the second video format, a video sequence reconstructed from the first video data, the method comprising:

reconstructing a video sequence from the first video data;

encoding the reconstructed video sequence as second video data in the second video format;

computing one or more second fingerprints of the second video data;

deriving at least one second bitstring from the second fingerprints; and validating the second video data using the second digital signature, including:

verifying the derived at least one second bitstring using the second digital signature, or verifying at least one second bitstring in one of said one or more signature units using the second digital signature, and comparing the derived at least one second bitstring and the verified at least one second bitstring.

14. A signed video bitstream stored or transmitted on a data carrier including:

first video data in a lossy first video format; and one or more signature units, each signature unit including at least a first digital signature and a second digital signature, for thereby enabling a recipient of the signed video bitstream to validate the signed video bitstream after the signed video bitstream has been transcoded into a second video format, wherein each signature unit optionally includes a first bitstring and a second bitstring, wherein:

the first digital signature is a signature of at least one first bitstring derived from first fingerprints computed from the first video data, and the second digital signature is a signature of at least one second bitstring derived from second fingerprints, which have been computed from second video data obtained by encoding, in a second video format, a video sequence reconstructed from the first video data.

15. A device comprising processing circuitry for providing a signed video bitstream for transcoding from a first video format into a second video format, comprising a processor for:

obtaining first video data in a lossy first video format;

reconstructing a video sequence from the first video data;

encoding the reconstructed video sequence as second video data in a second video format;

computing one or more first fingerprints of the first video data and one or more second fingerprints of the second video data;

deriving at least one first bitstring from the first fingerprints and at least one second bitstring from the second fingerprints; and providing a signed video bitstream stored or transmitted on a data carrier, which includes the first video data and one or more signature units, each signature unit including a first digital signature of the derived first bitstring and a second digital signature of the derived second bitstring, for thereby enabling a recipient of the signed video bitstream to validate the signed video bitstream after the signed video bitstream has been transcoded into the second video format, wherein each signature unit optionally includes the derived first bitstring and second bitstring.

16. A computer program stored on a non-transitory computer-readable medium comprising instructions which, when the program is executed by a computer, cause the computer to carry out a method of providing a signed video bitstream suitable for transcoding from a first video format into a second video format, the method comprising:

obtaining first video data in a lossy first video format;

reconstructing a video sequence from the first video data;

encoding the reconstructed video sequence as second video data in a second video format;

computing one or more first fingerprints of the first video data and one or more second fingerprints of the second video data;

deriving at least one first bitstring from the first fingerprints and at least one second bitstring from the second fingerprints; and providing a signed video bitstream stored or transmitted on a data carrier, which includes the first video data and one or more signature units, each signature unit including a first digital signature of the derived first bitstring and a second digital signature of the derived second bitstring, for thereby enabling a recipient of the signed video bitstream to validate the signed video bitstream after the signed video bitstream has been transcoded into the second video format, wherein each signature unit optionally includes the derived first bitstring and second bitstring.

* * * * *